United States Patent
Wang et al.

(10) Patent No.: US 12,074,327 B2
(45) Date of Patent: Aug. 27, 2024

(54) ARTIFICIAL GRAPHITE, PREPARATION METHOD THEREOF, SECONDARY BATTERY CONTAINING THE SAME AND POWER CONSUMING DEVICE

(71) Applicant: CONTEMPORARY AMPEREX TECHNOLOGY CO., LIMITED, Ningde (CN)

(72) Inventors: Jiazheng Wang, Ningde (CN); Binyi Chen, Ningde (CN); Xuan Li, Ningde (CN); Na Liu, Ningde (CN); Chuying Ouyang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/052,430

(22) Filed: Nov. 3, 2022

(65) Prior Publication Data

US 2023/0128168 A1    Apr. 27, 2023

Related U.S. Application Data (63) Continuation of application No. PCT/CN2021/117986, filed on Sep. 13, 2021.

(51) Int. Cl.
*H01M 4/62* (2006.01)
*C01B 32/205* (2017.01)

(52) U.S. Cl.
CPC .......... *H01M 4/625* (2013.01); *C01B 32/205* (2017.08); *C01P 2004/03* (2013.01); *C01P 2004/61* (2013.01); *C01P 2006/11* (2013.01); *C01P 2006/12* (2013.01); *C01P 2006/40* (2013.01)

(58) Field of Classification Search
None
See application file for complete search history.

(56) References Cited

U.S. PATENT DOCUMENTS

2021/0280857 A1* 9/2021 Liang ................ H01M 10/0525

FOREIGN PATENT DOCUMENTS

| CN | 102637859 A | 8/2012 |
| CN | 2016115418 A | 6/2016 |
| CN | 104143635 B | 10/2018 |
| CN | 109704323 A | 5/2019 |
| CN | 110718690 A | 1/2020 |
| CN | 110723730 A | 1/2020 |
| JP | H02283607 A | 11/1990 |

(Continued)

OTHER PUBLICATIONS

The World Intellectual Property Organization (WIPO) International Search Report for PCT/CN2021/117986 Jun. 10, 2022 7 pages (including English translation).

(Continued)

*Primary Examiner* — Ronak C Patel
(74) *Attorney, Agent, or Firm* — ANOVA LAW GROUP, PLLC (57) ABSTRACT

An artificial graphite satisfies: $PD_{5t}/PD_{0.5t} \leq 1.35$, where $PD_{5t}$ is a compacted density of the artificial graphite measured under a pressure of 5 ton, and $PD_{0.5t}$ is a compacted density of the artificial graphite measured under a pressure of 0.5 ton.

16 Claims, 4 Drawing Sheets

(a)

(b)

(56) References Cited

FOREIGN PATENT DOCUMENTS

| JP | 2010522969 A | 7/2010 |
|---|---|---|
| JP | 2022545912 A | 11/2022 |
| WO | 2021108983 A1 | 6/2021 |
| WO | 2021108987 A1 | 6/2021 |

OTHER PUBLICATIONS

The World Intellectual Property Organization (WIPO) Written Opinion for PCT/CN2021/117986 Jun. 10, 2022 9 Pages (including translation).
The Japan Patent Office (JPO) Notification of Reasons for Refusal for Application No. 2022-569629 Dec. 19, 2023 5 Pages (including translation).
The European Patent Office (EPO) The Extended European Search Report for Application No. 21942134.4, Jan. 23, 2024 8 Pages.

\* cited by examiner (a)

ARTIFICIAL GRAPHITE, PREPARATION METHOD THEREOF, SECONDARY BATTERY CONTAINING THE SAME AND POWER CONSUMING DEVICE

CROSS-REFERENCE TO RELATED APPLICATION

This application is a continuation of International Application No. PCT/CN2021/117986, filed on Sep. 13, 2021, the entire content of which is incorporated herein by reference.

TECHNICAL FIELD

The present application relates to the field of graphite materials, and in particular to an artificial graphite, a preparation method thereof, a secondary battery containing the same and a power consuming device.

BACKGROUND ART

Secondary batteries are widely used because of their outstanding characteristics such as high energy density, no pollution and long service life.

However, the volume expansion of a secondary battery will occur during the cycle process, which leads to an increase the internal stress of the battery and affects the service life and safety performance of the battery. For example, with the rapid popularity of new energy vehicles, the market has higher and higher requirements on the service life and safety performance of power secondary batteries. In order to enhance the market competitiveness of new energy vehicles, it is indeed necessary to provide a secondary battery with both good electrical properties and safety performance.

SUMMARY

The present application provides an artificial graphite capable of reducing the volume expansion of a secondary battery during the cycle process, a preparation method thereof, a secondary battery containing the same, and a power consuming device.

In some aspects, the present application provides an artificial graphite, the artificial graphite satisfying: $PD_{5t}/PD_{0.5t} \leq 1.35$, wherein $PD_{5t}$ is a compacted density of the artificial graphite measured under a pressure of 5 t, and $PD_{0.5t}$ is a compacted density of the artificial graphite measured under a pressure of 0.5 t.

It has been found for the first time in the present application that $PD_{5t}/PD_{0.5t}$ reflects the sensitivity of graphite density to pressure changes, wherein $PD_{5t}$ is a compacted density of the artificial graphite measured under a pressure of 5 t, and $PD_{0.5t}$ is a compacted density of the artificial graphite measured under a pressure of 0.5 t. An artificial graphite, as a negative electrode material for a secondary battery, will be subjected to a varying force with repeated intercalation and de-intercalation of lithium. It has been found in the present application that $PD_{5t}/PD_{0.5t}$ can reflect the expansion change of the artificial graphite during repeated intercalation and de-intercalation of lithium. When $PD_{5t}/PD_{0.5t} \leq 1.35$ for the artificial graphite, its expansion force during the cycle process is small, and thus the battery exhibits a low full-charge expansion rate, so that the battery has good cycle performance. When $PD_{5t}/PD_{0.5t} \leq 1.35$ for the artificial graphite, the material has strong deformation resistance. During the cycle process of a lithium-ion battery, the repeated intercalation and de-intercalation of lithium in a negative electrode results in repeated expansion and contraction under force. Once the deformation resistance of the negative electrode is improved, its expansion during the cycle process is lower, the structure is more stable, and the cycle performance is better.

$PD_{5t}/PD_{0.5t}$ can effectively reflect the ability of the material to resist deformation by an external force. When $PD_{5t}/PD_{0.5t} \leq 1.35$, the material has strong resistance to deformation. During the cycle process of a battery, the repeated intercalation and de-intercalation of lithium in a negative electrode results in repeated expansion and contraction under force. Once the deformation resistance of the negative electrode is improved, its expansion during the cycle process is lower, the structure is more stable, and the cycle performance is better.

In any embodiment, the artificial graphite satisfies: $1.23 \leq PD_{5t}/PD_{0.5t} \leq 1.3$. For example, the value of $PD_{5t}/PD_{0.5t}$ can be 1.20-1.25, 1.25-1.30, or 1.30-1.35. The artificial graphite based on this scheme is used in a secondary battery, and the performance of the battery is further improved.

In some embodiments, the artificial graphite satisfies: $PD_{5t} \geq 1.8$ g/cm$^3$; for example, 1.8 g/cm$^3 \leq PD_{5t} \leq 1.95$ g/cm$^3$. In yet other embodiments, the value of $PD_{5t}$ is 1.8 to 1.85 g/cm$^3$, for example 1.85 to 1.90 g/cm$^3$, for example 1.90 to 1.95 g/cm$^3$. The artificial graphite based on this scheme is used in a secondary battery, and the energy density performance of the battery is further improved.

In some embodiments, the artificial graphite satisfies: $PD_{0.5t} \geq 1.4$ g/cm$^3$; for example, 1.4 g/cm$^3 \leq PD_{0.5t} \leq 1.5$ g/cm$^3$. In yet other embodiments, the value of $PD_{0.5t}$ is 1.4 to 1.45 g/cm$^3$, for example 1.45 to 1.50 g/cm$^3$. The artificial graphite based on this scheme is used in a secondary battery, and the energy density performance of the battery is further improved.

In some embodiments, the median particle size Dv50 of the artificial graphite satisfies: Dv50 ≥ 10 μm; for example, 19 μm ≤ Dv50 ≤ 22 μm. In yet other embodiments, the value of the median particle size Dv50 of the artificial graphite is 10 to 13 μm, for example 13 to 16 μm, for example 16 to 19 μm, for example 19 to 22 μm. The artificial graphite based on this scheme is used in a secondary battery, and the reasonable control of the particle size is beneficial to prevent the expansion of a negative electrode material from being too large, which is conducive to further improving the kinetic performance and cycle performance of the battery.

In some embodiments, the specific surface area SSA of the artificial graphite satisfies: SSA ≤ 1.5 g/m$^2$; for example, 1.0 g/m$^2$ ≤ SSA ≤ 1.4 g/m$^2$. In yet other embodiments, the value of the specific surface area SSA of the artificial graphite is 1.0 to 1.2 g/m$^2$, for example 1.2 to 1.4 g/m$^2$, for example 1.4 to 1.5 g/m$^2$. The artificial graphite based on this scheme is used in a secondary battery, and a negative electrode of the battery has a sufficient active area for intercalating lithium, which is conducive to further improving the rapid charging capacity of the battery.

In some embodiments, the tap density (also referred to as a "tapped density") of the artificial graphite is 0.9 g/cm$^3$ or more; for example, the tap density of the artificial graphite is 1.0 g/cm$^3$-1.4 g/cm$^3$. In yet other embodiments, the value of the tap density of the artificial graphite is 0.9 to 1.1 g/cm$^3$, for example 1.1 to 1.3 g/cm$^3$. The artificial graphite based on this scheme is used in a secondary battery, and it is beneficial to the improvement of the compacted density of a negative electrode plate, thereby further improving the energy density of the battery.

In some embodiments, the degree of graphitization of the artificial graphite is 90% or more; for example 92% or more, for example 94% or more, for example 96% or more, for example 98% or more, for example 90 to 100%. The artificial graphite based on this scheme is used in a secondary battery, and the performance of the secondary battery is further improved. This scheme is beneficial to the improvement of the graphite gram capacity and the elimination of lattice defects, thus facilitating to improve the energy density and storage performance of a cell.

In some embodiments, the gram capacity of the artificial graphite is 340 mAh/g or more; for example 345 to 355 mAh/g. In yet other embodiments, the gram capacity of the artificial graphite is 340 to 345 mAh/g, for example 345 to 350 mAh/g, for example 350 to 355 mAh/g. The artificial graphite based on this scheme is used in a secondary battery, and the capacity performance of the secondary battery is further improved.

In some aspects, the present application provides a method for preparing an artificial graphite, comprising the following steps:
(1) green coke particles, calcined coke particles, a binder and a solvent are mixed;
(2) the product of the previous step is formed;
(3) at least part or all of the solvent is removed from the product of the previous step to obtain a green compact;
(4) the green compact is artificially graphitized to obtain a graphite compact;
(5) the graphite compact is made into a powder to obtain an artificial graphite;
wherein the artificial graphite satisfies: $PD_{5t}/PD_{0.5t} \leq 1.35$, wherein $PD_{5t}$ is a compacted density of the artificial graphite measured under a pressure of 5 t (ton), and $PD_{0.5t}$ is a compacted density of the artificial graphite measured under a pressure of 0.5 t.

In some embodiments, the step (1) comprises: green coke particles, calcined coke particles and a binder are mechanically stirred and mixed, and an appropriate amount of a solvent is added and stirred to obtain a stirred product. The stirred product is mud-like or bonded particles (such as millimeter or centimeter-sized bonded particles).

In some embodiments, the step (2) comprises: the stirred product obtained in the previous step is added to a forming device, and extruded or pressed for forming to obtain a wet green with a preset shape.

In some embodiments, the step (3) comprises: the wet green is dried and removed of the solvent, to obtain a green compact.

In some embodiments, the step (4) comprises: the green compact is placed into a graphitization furnace and graphitized at 2800° C. or more, to obtain a graphite compact.

In some embodiments, the step (5) comprises: the graphite compact is crushed and/or milled, screened (for example 200-mesh or more, for example 200 to 400-mesh) and demagnetized, to obtain an artificial graphite powder.

In some embodiments, the graphite compact is subjected to one or more of the following operations after being crushed into a powder: sieving, demagnetizing, or a combination thereof.

In some embodiments, in the preparation method of the artificial graphite, based on the total mass of the green coke particles, the calcined coke particles, and the binder being 100%, the content of the green coke particles is 35 wt % or more, for example, 35-55 wt %. Based on this scheme, the amount of the green coke particles is sufficient to produce a sufficient bonding strength, and the structural integrity of the green compact during the graphitization process can be maintained. In addition, the particles of the artificial graphite obtained based on this scheme have a low bonding strength therebetween, and can be easily disaggregated into a powder. If the content of the green coke particles is relatively low, the bonding effect of the graphite in the high-temperature graphitization stage is weak, and the strengthening effect is not enough, then $PD_{5t}/PD_{0.5t}$ is large.

In some embodiments, in the preparation method of the artificial graphite, the content of the calcined coke particles is 35 wt % or more, for example, 35-62 wt %. Based on this scheme, the performance of the artificial graphite is improved.

In some embodiments, in the preparation method of the artificial graphite, the content of the binder is 3 wt % or more, for example, 3-10 wt %. Based on this scheme, the amount of the binder is sufficient to produce a sufficient bonding strength, and the structural integrity of the green compact during the graphitization process can be maintained. In addition, the content of residual carbon of the binder in the artificial graphite obtained based on this scheme is low, and the performance of the artificial graphite is good.

In some embodiments, the apparent density of the green compact is 1.3 g/cm³ or more; for example, 1.3 g/cm³-1.5 g/cm³, or 1.35 g/cm³-1.45 g/cm³. Based on this scheme, the green compact in the graphitization stage has a sufficient strength, and will not collapse or pulverize. In addition, the particles of the graphite compact obtained by this scheme have a low bonding force therebetween, and can be easily disaggregated into a powder, and the obtained graphite powder has good performance. The graphite powder is used in a secondary battery, and the secondary battery exhibits good cycle performance and storage performance. The high apparent density indicates that the coke particles are more closely bonded to each other, and the stress during the graphitization process is higher, so that the $PD_{5t}/PD_{0.5t}$ is lower, and the cell performance will be better.

In some embodiments, the packing density of the green compact is 0.85 g/cm³ or less, for example, 0.45-0.85 g/cm³. In yet other embodiments, the packing density of the green compact is 0.45-0.55 g/cm³, for example 0.55-0.65 g/cm³, for example 0.65-0.75 g/cm³, for example 0.75-0.85 g/cm³. Based on this scheme, the artificial graphite has a higher degree of graphitization and fewer defects, and a secondary battery obtained based on the artificial graphite has better cycle performance and better storage life. When the packing density of the green compact is in the range of 0.45-0.85 g/cm³, the performance and production efficiency of the artificial graphite are well balanced. If the packing density is too large, the resistivity will be low. According to Joule's law, the calorific value of the graphitization furnace will be reduced, resulting in a relatively low graphitization temperature, in which case, the strengthening effect of coke particles will be weak, resulting in $PD_{5t}/PD_{0.5t}$ being relatively large. (The strengthening effect is mainly affected by the bonding effect and temperature)

In some embodiments, the dimension of the green compact in at least one direction is ≥1 cm, for example 1-10 cm, for example 1-3 cm, for example 3-5 cm, for example 5-7 cm, for example 7-9 cm.

In some embodiments, the dimensions of the green compact in at least two directions perpendicular to each other are all ≥1 cm, for example 1-10 cm, for example 1-3 cm, for example 3-5 cm, for example 5-7 cm, for example 7-9 cm.

In some embodiments, the sizes of the green compact in three directions perpendicular to each other are all ≥1 cm, for example 1-10 cm, for example 1-3 cm, for example 3-5 cm, for example 5-7 cm, for example 7-9 cm.

In some embodiments, the shape of the green compact is selected from one or more of columnar, spherical, ellipsoidal, and bulky shapes.

In some embodiments, the volatiles content of the green coke particles is ≥6 wt %, for example ≥8 wt %, for example 8 wt %-12 wt %. Based on this scheme, the green coke particles can generate volatiles with the bonding effect at 1000° C. or more, so that the structural integrity of the green compact is maintained. If the volatiles content of the green coke particles is relatively low, the bonding effect of the graphite in the high-temperature graphitization stage is weak, and the strengthening effect is relatively low, then $PD_{5t}/PD_{0.5t}$ is large.

In some embodiments, the median particle size Dv50 of the green coke particles is less than the median particle size Dv50 of the calcined coke particles. Based on this scheme, the green coke particles can better fill the gaps between the calcined coke particles, and thus can better play the role of bonding and better maintain the structural integrity of the compact during the graphitization process. The Dv50 of the green coke is lower than the Dv50 of the calcined coke, so the green coke is easier to uniformly disperse in a precursor, and thus has a more uniform bonding effect, which is conducive to maintaining a more uniform compressive stress and a more uniform strengthening effect, so that the $PD_{5t}/PD_{0.5t}$ is lower.

In some embodiments, the median particle size Dv50 of the green coke particles is 15 μm or less, for example, 8-14 μm. Based on this scheme, the green coke particles can better play the role of bonding and better maintain the structural integrity of the compact during the graphitization process.

In some embodiments, the median particle size Dv50 of the calcined coke particles is 20 μm or less, for example, 15-17 μm. Based on this scheme, the green coke particles can better play the role of bonding and better maintain the structural integrity of the compact during the graphitization process.

In some embodiments, the binder is evaporable or decomposable at 1000° C. or more. Based on this scheme, the green coke particles in the green compact play a bonding role mainly in a high temperature stage at 1000° C. or more, the binder component plays a bonding role mainly in a low temperature stage at 1000° C. or less, and the green compact is effectively bonded in all temperature stages of graphitization, so that the structural integrity of the compact is maintained. If the binder content is low, the bonding effect amongst the coke particles is not enough, the compressive stress is difficult to maintain, and the strengthening effect is not enough, which will cause the $PD_{5t}/PD_{0.5t}$ to be relatively large.

In some embodiments, the binder is a polymeric binder.

In some embodiments, the polymeric binder includes a water-soluble polymeric binder, a water-insoluble polymeric binder, or a combination thereof.

In some embodiments, the water-soluble polymeric binder is selected from: polyvinyl alcohol, starch, cellulose, or a combination thereof.

In some embodiments, the water-insoluble polymeric binder is selected from: a rubber binder, a thermosetting resin binder, or a combination thereof.

In some aspects, the present application provides a secondary battery comprising the artificial graphite of any of the above or comprising the artificial graphite prepared by the method of any of the above.

In some aspects, the present application provides a power consuming device comprising the above secondary battery.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

(a) and (b) of FIG. 1 are scanning electron microscope photographs of artificial graphites in an example of the present application and a comparative example, respectively.

In the drawings, the figures are not necessarily drawn to actual scale.

DETAILED DESCRIPTION OF EMBODIMENTS

The following further describes in detail implementations of the present application with reference to the accompanying drawings and embodiments. The detailed description of the following embodiments and the drawings are used to illustrate the principle of the present application by way of example, but shall not be used to limit the scope of the present application. In other words, the present application is not limited to the described embodiments.

Hereinafter, embodiments of a negative electrode active material and a manufacture method thereof, a secondary battery, and a power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. In addition, if minimum range values 1 and 2 are listed, and if maximum range values 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed in the text, and "0-5" is just an abbreviated representation of combinations of these numerical values. In addition, when a parameter is expressed as an integer of ≥2, it is equivalent to disclose that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, in some embodiments sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

In the description of the present application, it should be noted that, unless otherwise specified, "a plurality of" means at least two. An orientation or a position relationship indicated by the terms "upper", "lower", "left", "right", "inner", "outer", etc. is merely for convenient and brief description of the present application, rather than indicating or implying that an indicated apparatus or element needs to have a particular orientation or be constructed and operated in a particular orientation, and therefore cannot be construed as limiting the present application. In addition, the terms "first", "second", "third", etc. are merely for the purpose of description, and shall not be construed as indicating or implying relative importance. "Perpendicular" is not necessarily perpendicular in the strict sense, and a range of errors is allowed. "Parallel" is not necessarily parallel in the strict sense, and a range of errors is allowed.

Secondary Battery

In some embodiments, the present application provides a secondary battery.

Typically, a secondary battery comprises a positive electrode plate, a negative electrode plate, an electrolyte and a separator. During the charge/discharge process of the battery, active ions are intercalated and de-intercalated back and forth between the positive electrode plate and the negative electrode plate. The electrolyte is located between the positive electrode plate and the negative electrode plate and functions for ionic conduction. The separator is provided between the positive electrode plate and the negative electrode plate, and mainly prevents the positive and negative electrodes from short-circuiting and enables ions to pass through.

[Negative Electrode Plate]

The negative electrode plate typically comprise a negative electrode current collector and a negative electrode film provided on at least one surface of the negative electrode current collector.

As examples, the negative electrode current collector has two surfaces opposite in its own thickness direction, and the negative electrode film is laminated on either or both of the two opposite surfaces of the negative electrode current collector.

The negative electrode current collector can be made of a material with good conductivity and mechanical strength, and has the effects of conducting and current collecting. In some embodiments, the negative electrode current collector can be a copper foil.

The negative electrode film comprises a negative electrode active material.

In some embodiments, the present application provides a negative electrode active material of an artificial graphite, wherein when the artificial graphite satisfies $PD_{5t}/PD_{0.5t} \leq 1.35$, the deformation resistance of the material is strong. During the cycle process of a lithium-ion battery, the repeated intercalation and de-intercalation of lithium in a negative electrode results in repeated expansion and contraction under force. Once the deformation resistance of the negative electrode is improved, its expansion during the cycle process is lower, the structure is more stable, and the cycle performance is better.

It has been found for the first time in the present application that $PD_{5t}/PD_{0.5t}$ can reflect the sensitivity of an artificial graphite to pressure changes, wherein $PD_{5t}$ is a compacted density of the artificial graphite measured under a pressure of 5 t (49,000 N), and $PD_{0.5t}$ is a compacted density of the artificial graphite measured under a pressure of 0.5 t (4,900 N). An artificial graphite, as a negative electrode material for a secondary battery, will be subjected to a varying force with repeated intercalation and de-intercalation of lithium. It has been found in the present application that $PD_{5t}/PD_{0.5t}$ can reflect the expansion change of the artificial graphite during repeated intercalation and de-intercalation of lithium. When $PD_{5t}/PD_{0.5t} \leq 1.35$ for the artificial graphite, its expansion force during the cycle process is small, and thus the battery exhibits a low full-charge expansion rate. Optionally, the battery also exhibits one or more of the following advantages: high gram capacity, high first-cycle efficiency, good cycle performance, and long storage life.

In some embodiments, the artificial graphite satisfies: $1.23 \leq PD_{5t}/PD_{0.5t} \leq 1.3$. For example, the value of $PD_{5t}/PD_{0.5t}$ can be 1.20-1.25, 1.25-1.30, or 1.30-1.35. When the artificial graphite satisfies this condition, the cycle performance of the battery is further improved.

In some embodiments, the artificial graphite satisfies: $PD_{5t} \geq 1.8$ g/cm$^3$; for example, 1.8 g/cm$^3 \leq PD_{5t} \leq 1.95$ g/cm$^3$, 1.8 g/cm$^3 \leq PD_{5t} \leq 1.85$ g/cm$^3$, 1.85 g/cm$^3 \leq PD_{5t} \leq 1.90$ g/cm$^3$, and 1.90 g/cm$^3 \leq PD_{5t} \leq 1.95$ g/cm$^3$. The artificial graphite based on this scheme is used in a secondary battery, and the energy density performance of the battery is further improved.

In some embodiments, the artificial graphite satisfies: $PD_{0.5t} \geq 1.4$ g/cm$^3$; for example, 1.4 g/cm$^3 \leq PD_{0.5t} \leq 1.5$ g/cm$^3$. In yet other embodiments, the value of $PD_{0.5t}$ is 1.4-1.45 g/cm$^3$, for example 1.45-1.50 g/cm$^3$. The artificial graphite based on this scheme is used in a secondary battery, and the energy density of the secondary battery is further improved.

The compacted density of the artificial graphite under a particular pressure has a meaning that is well known in the art, and can be measured using methods known in the art. For example, it can be measured with reference to GB/T 24533-2019 using an electronic pressure testing machine (like UTM7305): An artificial graphite powder sample to be tested of a preset mass M is placed on a special mold for compaction (with a bottom area S), set under different pressures (for example, 4,900N and 49,000N are used in the present application), held under the pressure for 30 s, and released of the pressure, waiting for 10 s; the thickness H after compaction of the powder under the pressure is read on the device, and the compacted density under the pressure is calculated. The compacted density of the negative electrode active material under the pressure=M/(H*S).

In some embodiments, the median particle size Dv50 of the artificial graphite satisfies: Dv50≥10 μm; for example, 19 μm≤Dv50≤22 μm. In yet other embodiments, the median particle size Dv50 of the artificial graphite is 10-13 μm, for example 13-16 μm, for example 16-19 μm, for example 19-22 μm. The artificial graphite based on this scheme is used in a secondary battery, and the reasonable control of the particle size is beneficial to prevent the expansion of a negative electrode material from being too large, which is conducive to further improving the kinetic performance and cycle performance of the battery.

Dv50 is the corresponding particle size when the cumulative volume distribution percentage of the artificial graphite reaches 50%, which can be measured using methods known in the art. For example, it can be measured using laser diffraction particle size analysis. The measurement can be made with reference to the standard GB/T 19077-2016 using a laser particle size analyzer (e.g. Malvern Master Size 3000).

In some embodiments, the specific surface area SSA of the artificial graphite satisfies: SSA≤1.5 g/m$^2$; for example, 1.0 g/m$^2$≤SSA≤1.4 g/m$^2$. In yet other embodiments, the value of the specific surface area SSA of the artificial graphite is 1.0-1.2 g/m$^2$, for example 1.2-1.4 g/m$^2$, for example 1.4-1.5 g/m$^2$. The artificial graphite based on this scheme is used in a secondary battery, and a negative electrode has a sufficient active area for intercalating lithium, which is conducive to further improving the rapid charging capacity of the battery.

The specific surface area SSA of the artificial graphite has a meaning that is well known in the art, and can be measured using methods known in the art. For example, it can be measured with reference to GB/T 19587-2017 using nitrogen adsorption specific surface area analysis test method, and calculated with the BET (Brunauer Emmett Teller) method, wherein the nitrogen adsorption specific surface area analysis test can be conducted by the Tri-Star 3020 type specific surface area pore size analysis tester from Micromeritics Company in the United States.

In some embodiments, the tap density of the artificial graphite is 0.9 g/cm$^3$ or more; for example, the tap density of the artificial graphite is 1.0 g/cm$^3$-1.4 g/cm$^3$. In yet other embodiments, the value of the tap density of the artificial graphite is 0.9-1.1 g/cm$^3$, for example, 1.1-1.3 g/cm$^3$. The artificial graphite based on this scheme is used in a secondary battery, and it is beneficial to the improvement of the compacted density of a negative electrode plate, thereby further improving the energy density of the battery.

The tap density of the artificial graphite has a meaning that is well known in the art, and can be measured using methods known in the art. For example, the measurement can be conducted with reference to the standard GB/T 5162-2006 using a powder tap density tester. For example, the FZS4-4B type tap density meter of Beijing Iron and Steel Research Institute is used, and the test parameters are as follows: vibration frequency: 250±15 times/min, amplitude: 3±0.2 mm, vibration number: 5000 times, graduated cylinder: 25 mL.

In some embodiments, the degree of graphitization of the artificial graphite is 90% or more; for example 92% or more, for example 94% or more, for example 96% or more, for example 98% or more, for example 90 to 100%. The artificial graphite based on this scheme is used in a secondary battery, and the performance of the secondary battery is further improved. This scheme is beneficial to the improvement of the graphite gram capacity and the elimination of lattice defects, thus facilitating to improve the energy density and storage performance of a cell.

The degree of graphitization of the artificial graphite has a meaning that is well known in the art, and can be measured using methods known in the art. For example, an X-ray diffractometer (e.g., Bruker D8 Discover) can be used. With reference to JIS K 0131-1996 or JB/T 4220-2011, the size of d002 can be measured, and then the degree of graphitization can be calculated according to the formula G=(0.344-d002)/(0.344-0.3354)×100%, where d002 is the interlayer spacing in the graphite crystal structure expressed in nanometers (nm). In the X-ray diffraction analysis test, a copper target can be used as an anode target, and CuKα rays are used as a radiation source, with a ray wavelength λ=1.5418 Å, a scanning 2θ angle range of 20°-80°, and a scanning rate of 4°/min.

In some embodiments, the gram capacity of the artificial graphite is 340 mAh/g or more; for example, 345-355 mAh/g. In yet other embodiments, the gram capacity of the artificial graphite is 340-345 mAh/g, for example 345-350 mAh/g, for example 350-355 mAh/g. The artificial graphite based on this scheme is used in a secondary battery, and the performance of the secondary battery is further improved.

The gram capacity of the artificial graphite has a meaning that is well known in the art, and can be measured by methods known in the art. As an example, the measurement can be carried out as follows: the prepared artificial graphite, a conductive agent Super P, a binder (SBR), and a thickener (CMC) are fully stirred and mixed in an appropriate amount of deionized water in a mass ratio of 96.2:0.8:1.8:1.2 to make a slurry, and the prepared slurry is coated onto a copper foil current collector, and dried in an oven for later use; a lithium metal sheet is used as a counter electrode; a polyethylene (PE) film is used as a separator; ethylene carbonate (EC), ethyl methyl carbonate (EMC), and diethyl carbonate (DEC) are mixed in a volume ratio of 1:1:1, and then LiPF6 is uniformly dissolved in the above solution to obtain an electrolyte solution, where the concentration of LiPF6 is 1 mol/L; the above parts are assembled into a CR2430 type button battery in an argon gas-protected glove box. After standing for 12 hours, the obtained button battery is discharged to 0.005 V with a constant current at a current of 0.05 C, left standing for 10 minutes, and then discharged to 0.005 V with a constant current at a current of 50 μA; then, the battery is charged to 2 V with a constant current at a current of 0.1 C, and the charging capacity is recorded. The ratio of the charging capacity to the mass of the artificial graphite is the gram capacity of the artificial graphite.

In some embodiments, the present application provides a method for preparing an artificial graphite, comprising the following steps:
(1) green coke particles, calcined coke particles, a binder and a solvent are prepared into a mixture;
(2) the mixture is formed to obtain an intermediate;
(3) at least part or all of the solvent is removed from the intermediate to obtain a green compact;
(4) the green compact is graphitized to obtain a graphite compact;
(5) the graphite compact is made into a powder to obtain an artificial graphite;
wherein the artificial graphite satisfies: $PD_{5t}/PD_{0.5t} \leq 1.35$, wherein $PD_{5t}$ is a compacted density of the artificial graphite measured under a pressure of 5 t, and $PD_{0.5t}$ is a compacted density of the artificial graphite measured under a pressure of 0.5 t.

In some embodiments, the step (1) comprises: green coke particles, calcined coke particles and a binder are mechanically stirred and mixed, and an appropriate amount of a solvent is added and stirred to obtain a stirred product. The stirred product is mud-like or bonded particles (such as millimeter or centimeter-sized bonded particles).

The term "green coke" has a meaning well known in the art. For example, green coke complies with the provisions of NBSHT 0527-2019 Petroleum coke (green coke).

In some embodiments, the volatiles content of the green coke particles is ≥6 wt %, for example ≥8 wt %, for example 8 wt %-12 wt %. Based on this scheme, the green coke particles can generate volatiles with the bonding effect at 1000° C. or more, so that the structural integrity of the green compact is maintained. If the volatiles content of the green coke particles is relatively low, the bonding effect of the graphite in the high-temperature graphitization stage is weak, and the strengthening effect is relatively low, then $PD_{5t}/PD_{0.5t}$ is large.

The volatiles test of green coke refers to "SHT0026-1990-Determination method for volatiles from petroleum coke."

In some embodiments, based on the total mass of the green coke particles, the calcined coke particles, and the binder being 100%, the content of the green coke particles is 35 wt % or more, for example, 35 wt %-55 wt %. Based on this scheme, the amount of the green coke particles is sufficient to produce a moderate bonding strength, and the structural integrity of the green compact during the graphitization process can be maintained. In addition, the particles of the artificial graphite obtained based on this scheme have a low bonding strength therebetween, and can be easily disaggregated into a powder. If the content of the green coke particles is relatively low, the bonding effect of the graphite in the high-temperature graphitization stage is weak, and the strengthening effect is not enough, then $PD_{5t}/PD_{0.5t}$ is large.

In some embodiments, the median particle size Dv50 of the green coke particles is less than the median particle size Dv50 of the calcined coke particles. Based on this scheme, the green coke particles can better fill the gaps between the calcined coke particles, and thus can better play the role of bonding and better maintain the structural integrity of the compact during the graphitization process. The Dv50 of the green coke is lower than the Dv50 of the calcined coke, so the green coke is easier to uniformly disperse in a precursor, and thus has a more uniform bonding effect, which is conducive to maintaining a more uniform compressive stress and a more uniform strengthening effect, so that the $PD_{5t}/PD_{0.5t}$ is lower.

In some embodiments, the median particle size Dv50 of the green coke particles is 15 μm or less, for example, 8-14 μm. Based on this scheme, the green coke particles can better play the role of bonding and better maintain the structural integrity of the compact during the graphitization process.

The term "calcined coke" has a meaning well known in the art. For example, calcined coke complies with the provisions of YS T 625-2012 Calcined Petroleum Coke for Prebaked Anode.

In some embodiments, the median particle size Dv50 of the calcined coke particles is 20 μm or less, for example, 15-17 μm. Based on this scheme, the green coke particles can better play the role of bonding and better maintain the structural integrity of the compact during the graphitization process.

In some embodiments, the content of the calcined coke particles is 35 wt % or more, for example, 35 wt %-62 wt %. Based on this scheme, the performance of the artificial graphite is improved.

In some embodiments, the binder is evaporable or decomposable at 1000° ° C. or more. Based on this scheme, the green coke particles in the green compact play a bonding role mainly in a high temperature stage at 1000° C. or more, the binder component plays a bonding role mainly in a low temperature stage at 1000° C. or less, and the green compact is effectively bonded in all temperature stages of graphitization, so that the structural integrity of the compact is maintained.

In some embodiments, the binder is a polymeric binder. The polymeric binder may include a water-soluble polymeric binder, a water-insoluble polymeric binder, or a combination thereof.

In some embodiments, the water-soluble polymeric binder may comprise: polyvinyl alcohol, starch, cellulose, or a combination thereof.

In some embodiments, the water-insoluble polymeric binder is selected from: a rubber binder, a thermosetting resin binder, or a combination thereof.

In some embodiments, the content of the binder is 2 wt % or more, for example, 3 wt %-10 wt %, and further, for example, the content of the binder is ≤6%, for example, the content of the binder is 2%-4%. Based on this scheme, the amount of the binder is sufficient to produce a sufficient bonding strength, and the structural integrity of the green compact during the graphitization process can be maintained. In addition, the content of residual carbon of the binder in the artificial graphite obtained based on this scheme is low, and the performance of the artificial graphite is good. A carbonization and decomposition residue (residual carbon) of the binder belongs to hard carbon, and is difficult to graphitize. When the amount of residual carbon in an artificial graphite is large, the specific surface area of the artificial graphite will increase, and its capacity and first Coulombic efficiency are thus reduced, thus reducing the energy density and cycle performance of the battery. If the binder content is low, the bonding effect amongst the coke particles is not enough, the compressive stress is difficult to maintain, and the strengthening effect is not enough, which will cause the $PD_{5t}/PD_{0.5t}$ to be relatively large.

In some embodiments, the step (2) comprises: the mixture obtained in the previous step is added to a forming device, and extruded or pressed for forming to obtain an intermediate with a preset shape, which intermediate can be referred to as a wet green.

In some embodiments, the step (3) comprises: the wet green is dried and removed of the solvent, to obtain a green compact.

In some embodiments, the apparent density of the green compact is 1.3 g/cm$^3$ or more; for example, 1.3 g/cm$^3$-1.5 g/cm$^3$, or 1.35 g/cm$^3$-1.45 g/cm$^3$. Based on this scheme, the green compact in the graphitization stage has a sufficient strength, and will not collapse or pulverize. In addition, the particles of the graphite compact obtained by this scheme have a low bonding force therebetween, and can be easily disaggregated into a powder, and the obtained graphite powder has good performance. The graphite powder is used in a secondary battery, and the secondary battery exhibits good cycle performance and storage performance.

In the above scheme, the apparent density affects the stability and internal stress of the green compact, and the apparent density is 1.3 g/cm$^3$ or more; for example, 1.3 g/cm$^3$-1.5 g/cm$^3$, or 1.35 g/cm$^3$-1.45 g/cm$^3$. During the graphitization process, the graphite particles are strengthened by the stress, that is, the deformation resistance is enhanced, so that the value of $PD_{5t}/PD_{0.5t}$ of the obtained artificial graphite is ≤1.35. The high apparent density indicates that the coke particles are more closely bonded to each other, and the stress during the graphitization process is higher, so that the $PD_{5t}/PD_{0.5t}$ is lower, and the cell performance will be better.

The measuring method for the apparent density of the green compact is the drainage method. An exemplary measuring method comprises the following: one bonded bulky precursor is taken and weighed as a mass $m_1$. An appropriate amount of water is added to a beaker and weighed as a mass $m_2$, and the precursor is tied with a fine copper wire with a negligible volume (diameter <0.05 mm) and placed in the water, such that the water surface slightly covers the precursor and the precursor do not contact the bottom of the beaker. The total mass of the above-mentioned beaker, water and precursor suspended in the water is weighed as $m_3$, and the density of water is approximately 1 g/cm$^3$, then the density of the precursor is $m_1/(m_3-m_2)$ g/cm$^3$. 10 samples are measured in total and an average value is taken as the apparent density of the green compact.

In some embodiments, the packing density of the green compact is 0.85 g/cm$^3$ or less, for example, 0.45-0.85 g/cm$^3$. In yet other embodiments, the packing density of the green compact is 0.45-0.55 g/cm$^3$, for example 0.55-0.65 g/cm$^3$, for example 0.65-0.75 g/cm$^3$, for example 0.75-0.85 g/cm$^3$. Based on this scheme, the artificial graphite has a higher degree of graphitization and fewer defects, and a secondary battery obtained based on the artificial graphite has better cycle performance and storage life. When the packing density of the green compact is in the range of 0.45-0.85 g/cm$^3$, the performance and production efficiency of the artificial graphite are well balanced. If the packing density is too large, the resistivity will be low. According to Joule's law, the calorific value of the graphitization furnace will be reduced, resulting in a relatively low graphitization temperature, in which case, the strengthening effect of coke particles will be weak, resulting in $PD_{5t}/PD_{0.5t}$ being relatively large. (The strengthening effect is mainly affected by the bonding effect and temperature).

For the test of the packing density of the green compact, refer to GB/T 14685-2011 Pebble and Crushed Stone for Construction, Section 7.13 Packing Density and Porosity (Loose Packing Density).

In some embodiments, the dimension of the green compact in at least one direction is ≥1 cm, for example 1-10 cm, for example 1-3 cm, for example 3-5 cm, for example 5-7 cm, for example 7-9 cm.

In some embodiments, the dimensions of the green compact in at least two directions perpendicular to each other are all ≥1 cm, for example 1-10 cm, for example 1-3 cm, for example 3-5 cm, for example 5-7 cm, for example 7-9 cm.

In some embodiments, the sizes of the green compact in three directions perpendicular to each other are all ≥1 cm, for example 1-10 cm, for example 1-3 cm, for example 3-5 cm, for example 5-7 cm, for example 7-9 cm.

In some embodiments, the shape of the green compact is selected from one or more of columnar, spherical, ellipsoidal, and bulky shapes. Columnar, spherical, ellipsoidal, and bulky shapes should be understood to include column-like, spherical-like, ellipsoid-like, and bulk-like shapes.

In some embodiments, the step (4) comprises: the green compact is placed into a graphitization furnace and graphitized at 2800° C. or more, to obtain a graphite compact.

In some embodiments, the step (5) comprises: the graphite compact is crushed and/or milled, screened (for example 200-mesh or more, for example 200 to 400-mesh) and demagnetized, to obtain an artificial graphite powder.

In some embodiments, the graphite compact is subjected to one or more of the following operations after being crushed into a powder: sieving, demagnetizing, or a combination thereof.

The application of the artificial graphite prepared above into a negative electrode film can effectively improve the cycle performance of a battery.

In some embodiments, the negative electrode film may also optionally comprise other negative electrode active materials that can be used for the negative electrode of secondary batteries. Other negative electrode active materials can be one or more of other graphite materials (e.g., other artificial graphites, or natural graphites), mesophase carbon micro beads (abbreviated as MCMB), hard carbon, soft carbon, silicon-based materials, and tin-based materials.

In some embodiments, the negative electrode film may further comprise a binder. As an example, the binder may be selected from one or more of polyacrylic acid (PAA), sodium polyacrylate (PAAS), polyacrylamide (PAM), polyvinyl alcohol (PVA), a butadiene styrene rubber (SBR), sodium alginate (SA), polymethacrylic acid (PMAA) and carboxymethyl chitosan (CMCS).

In some embodiments, the negative electrode film may also optionally comprise a thickener. As an example, the thickener may be sodium carboxymethyl cellulose (CMC-Na).

In some embodiments, the negative electrode film may also optionally comprise a conductive agent. As an example, the conductive agent for the negative electrode film can be selected from one or more of graphite, superconducting carbon, acetylene black, carbon black, Ketjen black, carbon dots, carbon nanotubes, graphene and carbon nanofibers.

[Positive Electrode Plate]

The positive electrode plate comprises a positive electrode current collector and a positive electrode film provided on at least one surface of the positive electrode current collector. As examples, the positive electrode current collector has two surfaces opposite in its own thickness direction, and the positive electrode film is laminated on either or both of the two opposite surfaces of the positive electrode current collector.

The positive electrode current collector can be made of a material with good conductivity and mechanical strength. In some embodiments, the positive electrode current collector can be an aluminum foil.

The positive electrode film comprises a positive electrode active material. The specific types of the positive electrode active materials are not limited specifically in the present application, and materials known in the art that can be used for the positive electrode of secondary batteries can be used, and the materials can be selected by those skilled in the art according to actual requirements.

In some embodiments, the secondary battery may be a lithium-ion secondary battery. The positive electrode active material can be selected from lithium transition metal oxides and modified materials thereof, and the modified materials can be those from doping modification and/or coating modification of the lithium transition metal oxides. For example, the lithium transition metal oxides can be selected from one or more of lithium cobalt oxides, lithium nickel oxides, lithium manganese oxides, lithium nickel manganese oxides, lithium nickel cobalt manganese oxides, lithium nickel cobalt aluminum oxides, and lithium containing phosphates of olivine structure.

As an example, the positive electrode active material can be selected from one or more of $LiCoO_2$, $LiNiO_2$, $LiMnO_2$, $LiMn_2O_4$, $LiNi_{1/3}Co_{1/3}Mn_{1/3}O_2$(NCM333), $LiNi_{0.5}Co_{0.2}Mn_{0.3}O_2$(NCM523), $LiNi_{0.6}Co_{0.2}Mn_{0.2}O_2$ (NCM622), $LiNi_{0.8}Co_{0.1}Mn_{0.1}O_2$(NCM811), $LiNi_{0.85}Co_{0.15}Al_{0.05}O_2$, $LiFePO_4$(LFP) and $LiMnPO_4$.

In some embodiments, the positive electrode film may also optionally comprise a binder. The type of the binder is not limited specifically, and can be selected by a person skilled in the art according to actual requirements. An an example, the binder for the positive electrode film may include one or more of polyvinylidene fluoride (PVDF) and polytetrafluoroethylene (PTFE).

In some embodiments, the positive electrode film may also optionally comprises a conductive agent. The type of the conductive agent is not limited specifically, and can be selected by a person skilled in the art according to actual requirements. As an example, the conductive agent used for the positive electrode film can include one or more of graphite, superconducting carbon, acetylene black, carbon black, Ketjen black, carbon dots, carbon nanotubes, graphene and carbon nanofibers.

[Electrolyte]

The electrolyte is located between the positive electrode plate and the negative electrode plate and functions for ionic conduction. The type of the electrolyte is not specifically limited in the present application, and can be selected according to actual requirements. For example, the electrolyte may be selected from at least one of solid electrolyte and liquid electrolyte (i.e., electrolyte solution).

In some embodiments, an electrolyte solution is used as the electrolyte. The electrolyte solution comprises an electrolyte salt and a solvent.

In some embodiments, the electrolyte salt can be selected from one or more of $LiPF_6$ (lithium hexafluorophosphate), $LiBF_4$(lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium bisoxalatodifluorophosphate) and LiTFOP (lithium tetrafluorooxalate phosphate).

In some embodiments, the solvent can be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS) and diethyl sulfone (ESE).

In some embodiments, the electrolyte solution may also optionally comprise an additive. For example, the additive can include a negative electrode film-forming additive, a positive electrode film-forming additive, and also an additive that can improve certain performance of the battery, such as an additive to improve the overcharge performance of a battery, an additive to improve the high temperature performance of a battery, and an additive to improve the low temperature performance of a battery, etc.

[Separator]

The secondary battery using an electrolyte solution and some secondary batteries using a solid electrolyte further comprise a separator. The separator is provided between the positive electrode plate and the negative electrode plate, and functions for separation. The type of the separator is not particularly limited in the present application, and any well known porous-structure separator with good chemical stability and mechanical stability can be selected. In some embodiments, the material of the separator can be selected from one or more of glass fibers, a non-woven, polyethylene, polypropylene and polyvinylidene fluoride. The separator may be a single-layer film, or a multi-layer composite film. When the separator is a multi-layer composite film, the materials in the respective layers may be the same or different.

[Outer Package]

In some embodiments, a secondary battery may comprise an outer package for encapsulating a positive electrode plate, a negative electrode plate and an electrolyte. As an example, the positive electrode plate, the negative electrode plate and a separator may be laminated or wrapped to form a laminated or wrapped-structure cell, which is encapsulated within the outer package. An electrolyte solution can be used as the electrolyte, and the electrolyte solution is infiltrated into the cell. The number of the cells in the secondary battery may be one or more, and can be adjusted according to the requirements.

In some embodiments, the outer package of the secondary battery may be a soft bag, such as a pouch-type soft bag. The material of the soft bag can be a plastic, for example, comprising one or more of polypropylene PP, polybutylene terephthalate PBT, polybutylene succinate PBS, etc. The outer package of the secondary battery may also be a hard shell, such as an aluminum shell, etc.

[Preparation Method of Secondary Battery]

A method for preparing a secondary battery comprises the step of preparing a negative electrode plate using the artificial graphite of the present application.

In some embodiments, the step of preparing a negative electrode plate using the artificial graphite of the first aspect of the present application may comprise: a negative electrode active material comprising the artificial graphite of the first aspect of the present application, a binder and an optional thickener and conductive agent are dispersed in a solvent, which may be deionized water, to form a uniform negative electrode slurry; and the negative electrode slurry is coated onto a negative electrode current collector, and is then subjected to procedures such as drying and cold pressing, so as to obtain the negative electrode plate.

The method for preparing a secondary battery may further comprise the step of preparing a positive electrode plate. In some embodiments, a positive electrode active material, a conductive agent and a binder can be dispersed in a solvent (e.g., N-methylpyrrolidone, NMP for short) to form a uniform positive electrode slurry; and the positive electrode slurry is coated onto a positive electrode current collector, and is then subjected to procedures such as drying and cold pressing, so as to obtain the positive electrode plate.

The method for preparing a secondary battery further comprises the step of assembling the negative electrode plate, the positive electrode plate and an electrolyte into a secondary battery. In some embodiments, the positive electrode plate, the separator, and the negative electrode plate can be wound or laminated in sequence, such that the separator is located between the positive electrode plate and the negative electrode plate and functions for isolation to obtain a cell; and the cell is placed in an outer package, and an electrolyte solution is injected and sealed to obtain the secondary battery of the present application.

Figure 2:
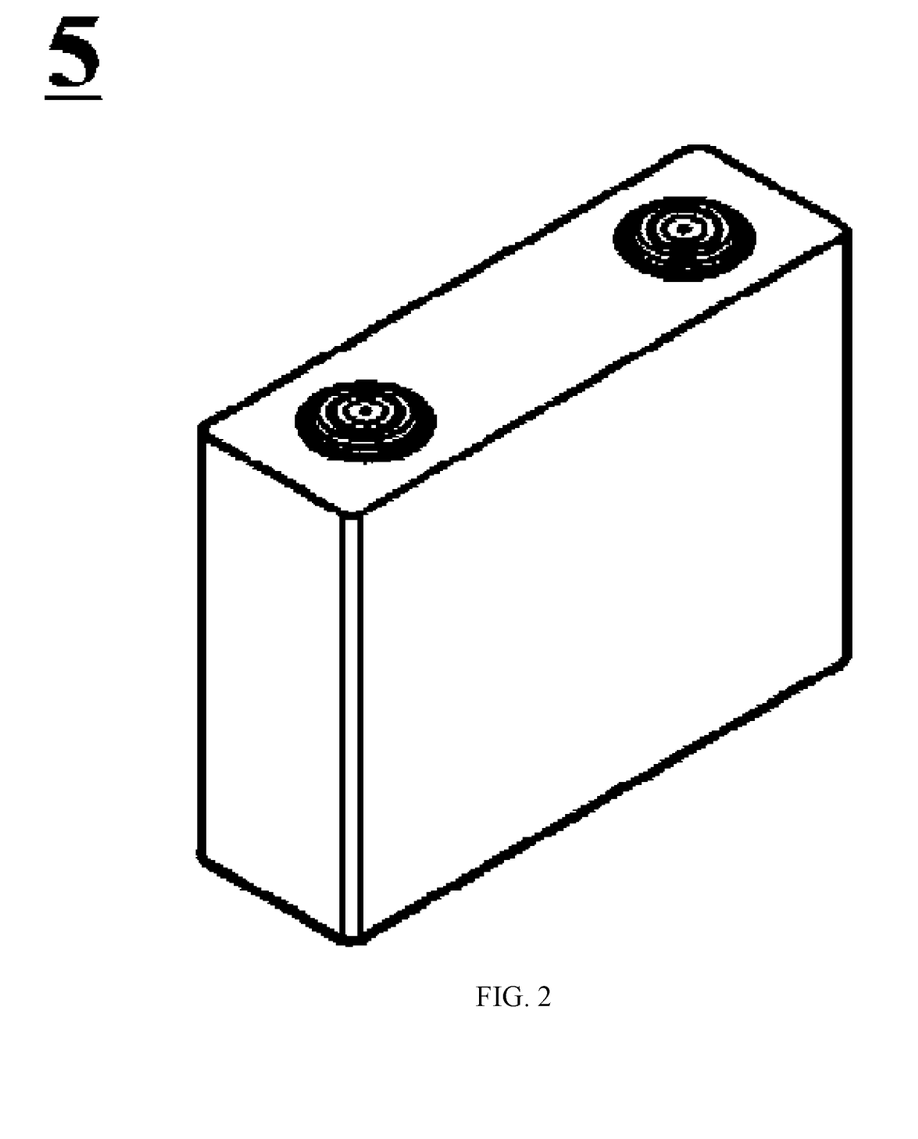
FIG. 2 is a schematic diagram of a secondary battery provided by an embodiment of the present application.

The shape of the secondary battery is not particularly limited in the present application, and may be cylindrical, square or of any other shape. FIG. 2 shows a secondary battery 5 with a square structure as an example.

In some embodiments, the secondary battery can be assembled into a battery module, and the number of the secondary batteries contained in the battery module can be multiple, and the specific number can be adjusted according to the application and capacity of the battery module.

Figure 3:
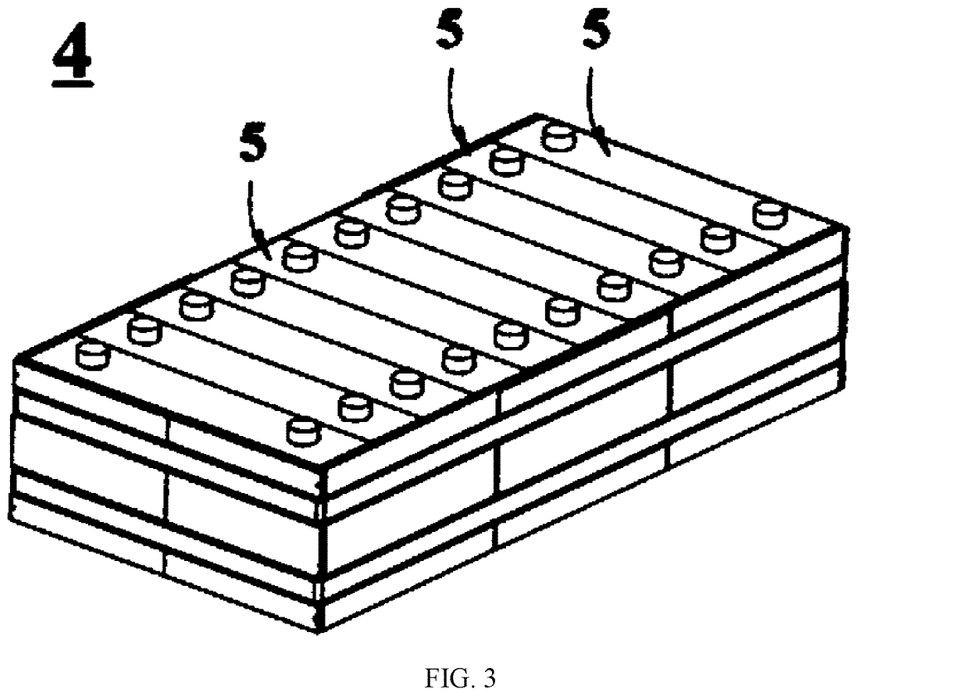
FIG. 3 is a schematic diagram of a battery module provided by an embodiment of the present application.

FIG. 3 is a battery module 4 as an example. Referring to FIG. 3, in the battery module 4, a plurality of secondary batteries 5 can be provided sequentially in the length direction of the battery module 4. Apparently, the secondary batteries can also be disposed in any other manner. Furthermore, the plurality of secondary batteries 5 can be fixed by fasteners.

Optionally, the battery module 4 may also comprise a housing with an accommodating space, in which a plurality of secondary batteries 5 are accommodated.

In some embodiments, the above battery module can also be assembled into a battery pack, and the number of the battery modules contained in the battery pack can be adjusted according to the application and capacity of the battery pack.

Figure 4:
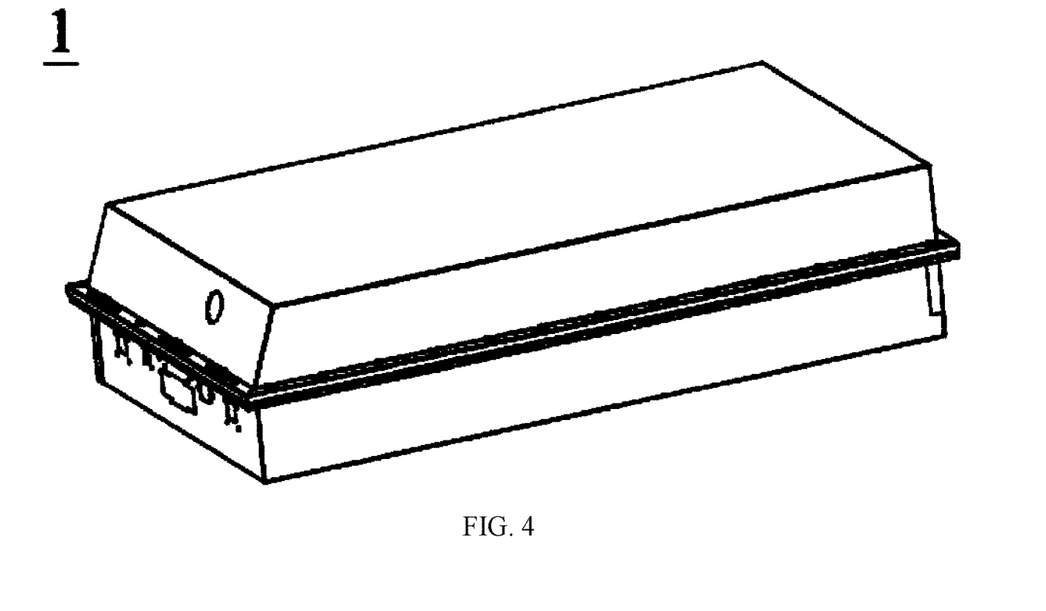
FIG. 4 is a schematic diagram of a battery pack provided by an embodiment of the present application.
Figure 5:
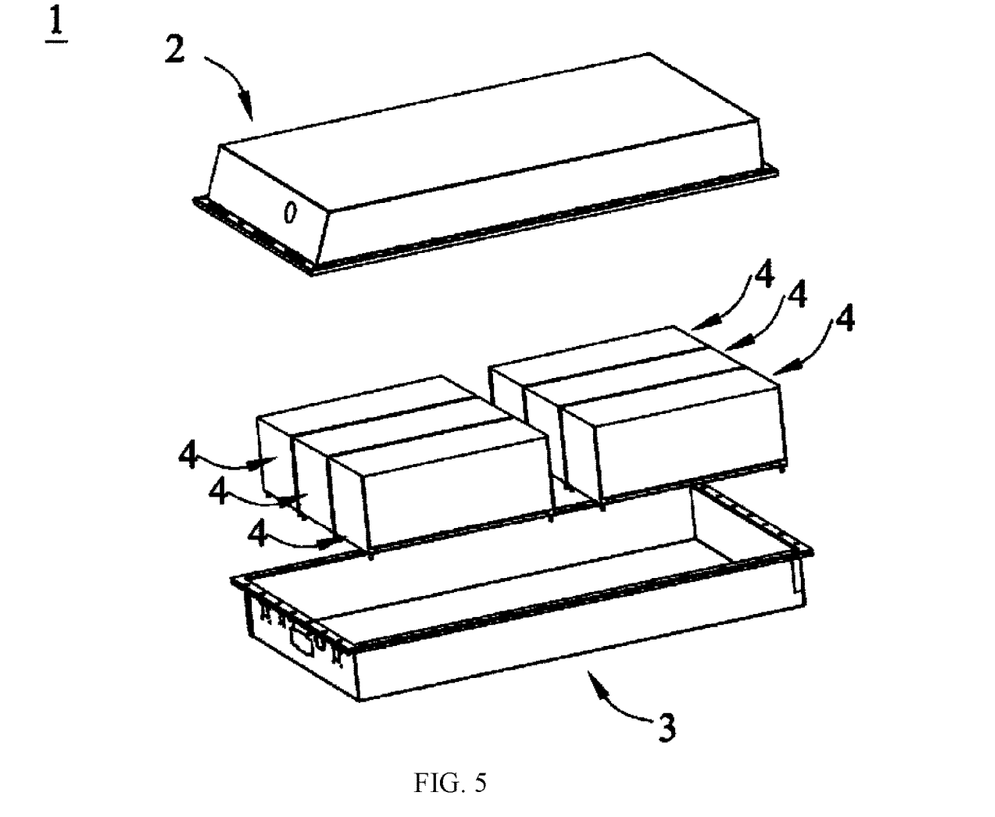
FIG. 5 is an exploded view of the battery pack of FIG. 4.

FIG. 4 and FIG. 5 show a battery pack 1 as an example. Referring to FIG. 4 and FIG. 5, the battery pack 1 can include a battery case and a plurality of battery modules 4 provided in the battery case. The battery case comprises an upper case body 2 and a lower case body 3, wherein the upper case body 2 can cover the lower case body 3 to form a closed space for accommodating the battery modules 4. A plurality of battery modules 4 can be disposed in the battery case in any manner.

[Power Consuming Device]

In some embodiments, the present application provides a power consuming device. The power consuming device comprises at least one of the secondary battery, battery module or battery pack provided by the present application. The secondary battery, battery module or battery pack may be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but are not limited thereto.

For the power consuming device, the secondary battery, battery module or battery pack can be selected according to the usage requirements thereof.

Figure 6:
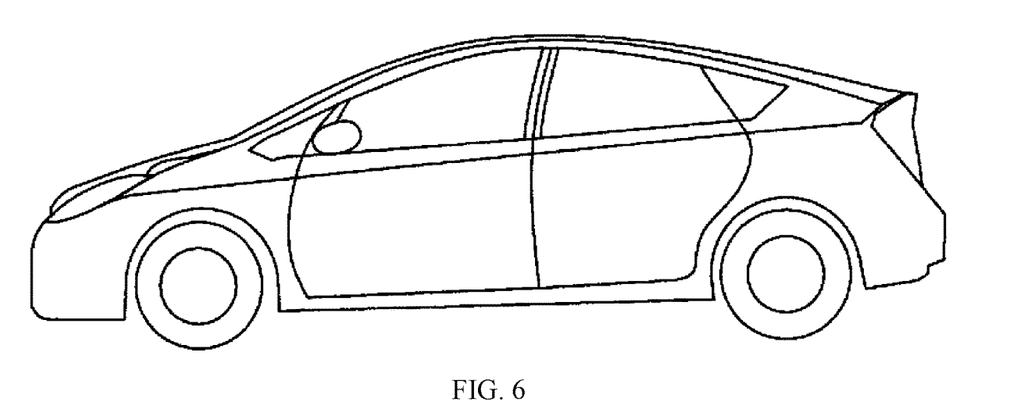
FIG. 6 is a schematic diagram of a device provided by an embodiment of the present application.

FIG. 6 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module can be used.

As another example, the device may be a mobile phone, a tablet, a laptop computer, etc. The device is generally required to be thin and light, and may use a secondary battery as a power source.

Although the present application is described with reference to some embodiments, various improvements may be made thereto, and the components thereof may be replaced with equivalents, without departing from the scope of the present application. Especially, various technical features mentioned in the embodiments may be combined together in any manner as long as there is no structural conflict. The present application is not limited to specific embodiments disclosed herein, but includes all technical solutions that fall within the scope of the claims.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. The reagents or instruments used, if they are not marked with the manufacturer, are common products that are commercially available.

1. Preparation of Artificial Graphite

Examples 1-7

Examples 1-7 use a graphitization furnace to prepare an artificial graphite, and the preparation method comprise the following steps:

(1) Preparation of green compact

A precursor composition was formulated according to the precursor formula shown in Table 2, and water was added thereto and stirred to a mud, and then the mud was extruded and granulated for forming, and then dried to a moisture content of less than 3% to obtain a green compact. The shape of a single green compact is cylindrical, with a dimension φ of 15 mm×4 mm. The apparent density and packing density of the green compact are as shown in Table 2.

(2) Artificial graphitization

The green compact prepared in the previous step was graphitized. The peak temperature at which the graphitization was performed reached 2800° C. The graphitization was carried out using a device known in the art, for example, a graphitization furnace, further for example, an Acheson graphitization furnace.

(3) Powdering

A crusher was used to crush the graphite compact into a powder, and the powder was passed through a 325-mesh sieve, and the powder product that passed through the sieve was collected. The sieved powder product was demagnetized using a demagnetizer, such that the Fe+Co+Ni+Cr+Zn element content in the powder product is <0.1 ppm. An artificial graphite (powder) was obtained.

Comparative Examples 1 to 9

The main difference between Comparative Examples 1 to 2 and Example 1 is that the apparent density and/or packing density of the green compact are different, see Table 2 for details.

The main difference between Comparative Examples 3 to 9 and Example 1 is that the precursor formulas are different, see Table 2 for details.

2. Analysis and Test Items

The artificial graphites prepared in Examples and Comparative Examples and the intermediate products of each step were tested. The main test method comprises:

The compact integrity (V2/V1) test method for the green compact comprises: 20 green compacts were taken randomly, and the total volume V1 of the 20 green compacts was measured using the drainage method; after the graphitization treatment, 20 graphite compacts were randomly selected, and the total volume V2 of the 20 graphite compacts was measured using the drainage method. The degree of compact integrity is represented by the value of V2/V1. If V2/V1≥70%, the structure is well maintained; if 30%<V2/V1<70%, the integrity of the compact is average; and if V2/V1≤30%, the integrity of the compact is seriously deteriorated.

To further evaluate the performance of the artificial graphites as a negative electrode active material for secondary batteries, secondary batteries were assembled using the artificial graphites prepared above, and battery performance tests were conducted. A secondary battery assembly method comprises:

(1) Preparation of positive electrode plate $LiNi_{0.5}Co_{0.2}Mn_{0.3}O_2$ (NCM523), a conductive agent (acetylene black), and a binder (PVDF) were mixed in a mass ratio of 96:2:2, and a solvent NMP was added thereto and mixed uniformly to obtain a positive electrode slurry; and the positive electrode slurry was uniformly coated onto a positive electrode current collector (aluminum foil), and was then subjected to drying, cold pressing and slitting to obtain the positive electrode plate.

(2) Preparation of negative electrode plate

The artificial graphite powder of respective examples and comparative examples, a conductive agent acetylene black, a thickener CMC, and a binder SBR were mixed in a mass ratio of 96.4:1:1.2:1.4, and deionized water was added thereto as a solvent and mixed uniformly, to obtain a negative electrode slurry; and the negative electrode slurry was uniformly coated onto a negative electrode current collector (copper foil), and subjected to drying, cold pressing and slitting to obtain the negative electrode plate.

(3) Electrolyte solution

The solute of the electrolyte solution is a lithium salt of 1 mol/L LiPF6, and the solvent is a mixture of ethylene carbonate (EC), ethyl methyl carbonate (EMC) and diethyl carbonate (DEC) mixed in a volume ratio of 1:1:1.

(4) Separator

The separator is a polyethylene film.

(5) Preparation of secondary battery

The positive electrode plate, the separator, and the negative electrode plate described above were laminated in sequence, such that the separator was located between the positive electrode plate and the negative electrode plate, and then winding was performed to obtain a bare cell; and the bare cell was placed in an outer package housing, injected with the electrolyte solution, and subjected to procedures such as vacuum encapsulation, standing and forming, etc, to obtain the secondary battery.

The test items for the performance parameters of the secondary battery comprise:

(1) Cycle performance test, which includes: At 25° C., the secondary battery was subjected to full charge and full discharge cycle testing at a rate of 1C, until the capacity of the secondary battery decayed to 80% of the initial capacity, and the number of cycles was recorded.

(2) Expansion performance test, which includes: The thickness of the negative electrode plate was measured before the negative electrode plate was wound into a cell, and recorded as $h_1$. After the negative electrode plate was wound into a cell and prepared into a secondary battery, the secondary battery was fully charged at 1C, then the battery was disassembled, the negative electrode plate was separated, and the thickness of the negative electrode plate was measured and recorded as $h_2$. Then the full charge expansion rate of the negative electrode plate of the secondary battery is $(h_2-h_1)/h_1$.

(3) Storage life test, which includes: Firstly, charge and discharge capacity testing of the secondary battery was conducted at 25° C.: After standing at 25° C. for 2 hours, the secondary battery was fully discharged at 0.33C, then fully charged at 0.33C, and then fully discharged at 0.33C, and the second full discharge capacity was taken as the capacity $C_0$ of the secondary battery. Then the secondary battery was stored with standing at 60° C., and taken out every a fixed number of days for a capacity test at 25° C. The capacity $C_N$ for N days of storage was recorded, and the capacity retention rate $R=C_N/C_0$ was defined. When R is less than or equal to 0.8 for the first time, the storage days N at this time is recorded as the storage life of the secondary battery.

The precursor formulas, the parameters of the green compact, and the parameters of the graphite compact of the examples and comparative examples are as shown in Table 2.

The parameters of the artificial graphites (powder) of the examples and comparative examples are shown in Table 3.

The performance of secondary batteries assembled using the artificial graphites in the examples and comparative examples as the negative material is shown in Table 4.

TABLE 1

| | Process for preparing artificial graphite | | | | Green compact | | Graphitized compact |
|---|---|---|---|---|---|---|---|
| No. | Volatiles of green coke | Particle size DV50 of green coke | Particle size DV50 of calcined green coke | Precursor formula | Apparent density (g/cm³) | Packing density (g/cm³) | Compact integrity V2/V1 |
| Example 1 | 8% | 12.0 | 16.0 | 48% green coke + 48% calcined coke + 4% polyvinyl alcohol | 1.40 | 0.60 | 98% |
| Example 2 | 10% | 12.0 | 16.0 | 48% green coke + 48% calcined coke + 4% polyvinyl alcohol | 1.40 | 0.60 | 99% |
| Example 3 | 8% | 14.0 | 16.0 | 48% green coke + 48% calcined coke + 4% polyvinyl alcohol | 1.40 | 0.60 | 97% |
| Example 4 | 8% | 12.0 | 16.0 | 52% green coke + 44% calcined coke + 4% polyvinyl alcohol | 1.38 | 0.60 | 99% |
| Example 5 | 8% | 12.0 | 16.0 | 48% green coke + 46% calcined coke + 6% polyvinyl alcohol | 1.39 | 0.60 | 99% |
| Example 6 | 8% | 12.0 | 16.0 | 48% green coke + 48% calcined coke + 4% polyvinyl alcohol | 1.45 | 0.60 | 99% |
| Example 7 | 8% | 12.0 | 16.0 | 48% green coke + 48% calcined coke + 4% polyvinyl alcohol | 1.40 | 0.50 | 98% |
| Comparative example 1 | 8% | 12.0 | 16.0 | 48% green coke + 48% calcined coke + 4% polyvinyl alcohol | 1.20 | 0.60 | 5% |
| Comparative example 2 | 8% | 12.0 | 16.0 | 48% green coke + 48% calcined coke + 4% polyvinyl alcohol | 1.55 | 0.60 | 99% |
| Comparative example 3 | 8% | 12.0 | 16.0 | 48% green coke + 48% calcined coke + 4% polyvinyl alcohol | 1.40 | 1.00 | 98% |
| Comparative example 4 | 8% | 12.0 | / | Green coke powder | / | / | / |
| Comparative example 5 | 8% | / | 16.0 | Calcined coke powder | / | / | / |
| Comparative example 6 | 8% | 12.0 | 16.0 | 50% green coke + 50% calcined coke powder | / | / | / |
| Comparative example 7 | 8% | 12.0 | 16.0 | 30% green coke + 66% calcined coke + 4% polyvinyl alcohol | 1.40 | 0.60 | 8% |
| Comparative example 8 | 8% | 12.0 | 16.0 | 65% green coke + 31% calcined coke + 4% polyvinyl alcohol | 1.40 | 0.60 | 99% |
| Comparative example 9 | 8% | 12.0 | 16.0 | 48% green coke + 51% calcined coke + 1% polyvinyl alcohol | 1.40 | 0.60 | 20% |
| Comparative example 10 | 8% | 12.0 | 16.0 | 48% green coke + 40% calcined coke + 12% polyvinyl alcohol | 1.40 | 0.60 | 98% |
| Comparative example 11 | 5% | 12.0 | 16.0 | 48% green coke + 48% calcined coke + 4% polyvinyl alcohol | 1.40 | 0.60 | 30% |

TABLE 2

| | Parameters of artificial graphite | | | | | | | [Performance test of battery] | | |
|---|---|---|---|---|---|---|---|---|---|---|
| | $PD_{5t}$ | $PD_{0.5t}$ | $PD_{5t}/PD_{0.5t}$ | Dv50 | Tap density | Degree of graphitization | Specific surface area | Gram capacity | Full charge expansion rate | Storage life (days) |
| Example 1 | 1.905 | 1.485 | 1.28 | 15.5 | 1.00 | 96.2% | 1.20 | 355.0 | 18.0% | 300 |
| Example 2 | 1.903 | 1.475 | 1.29 | 15.8 | 0.98 | 96.2% | 1.22 | 355.2 | 18.1% | 295 |
| Example 3 | 1.905 | 1.466 | 1.30 | 15.9 | 1.03 | 96.3% | 1.23 | 355.1 | 18.2% | 300 |
| Example 4 | 1.897 | 1.457 | 1.30 | 16.1 | 1.05 | 96.3% | 1.25 | 355.3 | 17.9% | 290 |
| Example 5 | 1.896 | 1.448 | 1.31 | 15.7 | 0.96 | 96.0% | 1.23 | 355.1 | 18.0% | 290 |
| Example 6 | 1.911 | 1.489 | 1.28 | 16.0 | 1.02 | 96.1% | 1.24 | 354.9 | 17.8% | 295 |
| Example 7 | 1.92 | 1.488 | 1.29 | 15.9 | 1.06 | 97.0% | 1.18 | 360.3 | 17.9% | 310 |
| Comparative example 1 | 1.902 | 1.401 | 1.36 | 15.3 | 0.97 | 96.1% | 1.11 | 354.8 | 19.0% | 280 |
| Comparative example 2 | 1.855 | 1.353 | 1.37 | 15.1 | 0.77 | 96.1% | 3.05 | 354.3 | 19.0% | 220 |
| Comparative example 3 | 1.802 | 1.301 | 1.39 | 15.5 | 0.87 | 91.2% | 1.12 | 340.1 | 18.5% | 275 |
| Comparative example 4 | 1.904 | 1.402 | 1.36 | 13.2 | 1.03 | 95.5% | 0.99 | 354.6 | 18.8% | 270 |
| Comparative example 5 | 1.911 | 1.365 | 1.40 | 17.3 | 0.91 | 96.0% | 0.95 | 355.0 | 19.2% | 275 |
| Comparative example 6 | 1.908 | 1.393 | 1.37 | 15.1 | 1.01 | 95.8% | 0.97 | 354.8 | 18.9% | 280 |
| Comparative example 7 | 1.901 | 1.402 | 1.36 | 15.2 | 1.02 | 96.2% | 1.09 | 354.9 | 18.7% | 280 |
| Comparative example 8 | 1.902 | 1.403 | 1.36 | 15.8 | 0.88 | 95.9% | 2.88 | 354.8 | 18.6% | 230 |

TABLE 2-continued

| | Parameters of artificial graphite | | | | | | [Performance test of battery] | | |
|---|---|---|---|---|---|---|---|---|---|
| | $PD_{5t}$ | $PD_{0.5t}$ | $PD_{5t}/PD_{0.5t}$ | Dv50 | Tap density | Degree of graphitization | Specific surface area | Gram capacity | Full charge expansion rate | Storage life (days) |
| Comparative example 9 | 1.903 | 1.404 | 1.36 | 15.3 | 0.93 | 95.6% | 1.03 | 354.7 | 18.7% | 285 |
| Comparative example 10 | 1.867 | 1.358 | 1.37 | 16.3 | 0.82 | 94.9% | 3.2 | 346.4 | 18.5% | 215 |
| Comparative example 11 | 1.903 | 1.399 | 1.36 | 15.5 | 1.00 | 96.1% | 1.12 | 354.9 | 18.6% | 280 |

By analyzing the experimental data in Tables 1-2, the following experimental conclusions can be drawn:

(1) About the value of $PD_{5t}/PD_{0.5t}$

The $PD_{5t}/PD_{0.5t}$ of the artificial graphites of Examples 1 to 7 is ≤1.35, specifically between 1.28 and 1.31. $PD_{5t}/PD_{0.5t}$ reflects the sensitivity of graphite density to pressure changes, wherein $PD_{5t}$ is a compacted density of the artificial graphite measured under a pressure of 5 t, and $PD_{0.5t}$ is a compacted density of the artificial graphite measured under a pressure of 0.5 t. As the negative electrode of a secondary battery, the graphite material will also change strongly in the process of repeated intercalation and de-intercalation of lithium, so $PD_{5t}/PD_{0.5t}$ can reflect the expansion change of graphite in the process of repeated intercalation and de-intercalation of lithium. When $PD_{5t}/PD_{0.5t}$≤1.35, the expansion force of the lithium ion negative electrode material is small during the cycle process, which is beneficial to the improvement of the cycle performance. The experimental results of battery testing show that when the graphite materials of Examples 1 to 7 are used as the negative electrode active material for secondary batteries, the secondary batteries exhibit one or more of the following advantages: high gram capacity, high first-cycle efficiency, good cycle performance, low full charge expansion rate and long storage life.

(2) About apparent density of green compact

One main difference between Comparative Examples 1 to 2 and Examples 1 to 7 is that the apparent density of the green compact is different. The apparent density affects the stability and internal stress of the green compact, and the apparent density of the green compacts in Examples 1 to 7 is 1.3 g/cm³ or more; for example, 1.3 g/cm³-1.5 g/cm³, or 1.35 g/cm³-1.45 g/cm³. During the graphitization process, the graphite particles are strengthened by the stress, that is, the deformation resistance is enhanced, so that the value of $PD_{5t}/PD_{0.5t}$ of the obtained artificial graphite is ≤1.35. In addition, the experimental results show that the green compacts of Examples 1 to 7 are structurally stable and do not collapse in the graphitization stage, and the integrity of the obtained graphite compacts is 98% or more. In addition, after graphitization, the bonding strength between graphite particles is low, and disaggregatation can be achieved only after slight crushing, which has no or very little damage to the graphite surface. The experimental results of battery testing show that when the graphite materials of Examples 1 to 7 are used as the negative electrode active material for secondary batteries, the secondary batteries exhibit one or more of the following advantages: high gram capacity, high first-cycle efficiency, good cycle performance, low full charge expansion rate and long storage life.

The apparent density of the green compact of Comparative Example 1 is below 1.3 g/cm³, the stress on the graphite particles is insufficient, the strengthening effect is not enough, and the deformation resistance is insufficient (or poor), so the value of $PD_{5t}/PD_{0.5t}$ of the obtained artificial graphite is greater than 1.35. Therefore, its strength is not enough in the graphitization stage, the structure of the green compact is easy to collapse and pulverize, and thus the integrity of the graphite compact is low. In addition, the pulverization of the green compact will also cause the powder accumulation, so that volatile gases are difficult to discharge, and there is a risk of explosion.

The apparent density of the green compact of Comparative Example 2 is higher than 1.45 g/cm³, and the particles are tightly bonded after graphitization, and are not easily deaggregated into a powder, or require strong crushing to become a powder. Strong crushing will introduce many unrecoverable processing defects on the graphite surface, resulting in an excessively high specific surface area of graphite (up to 3.05 g/m²), so that the value of $PD_{5t}/PD_{0.5t}$ of the obtained artificial graphite is >1.35, thus reducing the cycle performance and storage performance of the secondary battery.

(3) About precursor formula

The main difference between Comparative Examples 3 to 10 and Example 1 to 7 is that the precursor formulas are different. In the precursor formula, the green coke component is beneficial to volatilize the volatiles in a high temperature stage at 1000° ° C. or more, and functions for bonding; the binder component mainly functions for bonding the coke particles at 1000° C. or less.

The green compacts obtained by the precursor formulas of Examples 1 to 7 have high compact integrity and are easily disaggregated after graphitization, and the obtained artificial graphite powders have a $PD_{5t}/PD_{0.5t}$≤1.35, specifically between 1.23 and 1.3.

In Comparative example 3, if the packing density of the green compact is too large (1.00 g/cm³), the resistivity will be low. According to Joule's law, the calorific value of the graphitization furnace will be reduced, resulting in a relatively low graphitization temperature, in which case, the strengthening effect of coke particles will be weak, resulting in $PD_{5t}/PD_{0.5t}$ being relatively large ($PD_{5t}/PD_{0.5t}$>1.39).

In Comparative Example 7, the mass fraction of green coke is less than 35%, the volatiles amount is low in the high temperature stage at 1000° C. or more, the bonding strength is not enough, the bulk is easy to collapse, and the compact integrity is poor. If the content of the green coke particles is relatively low, the bonding effect of the graphite in the high-temperature graphitization stage is weak, and the strengthening effect is not enough, then $PD_{5t}/PD_{0.5t}$ is large.

In Comparative Example 8, the mass fraction of green coke is more than 55%, the volatiles amount is too high in the high temperature stage at 1000° C. or more, the bonding between particles is too strong, and it is not easy to disaggregate after graphitization.

In Comparative Example 9, the mass fraction of the binder is less than 3%, the bonding strength is low when heated in the low temperature stage at 1000° C. or less, the structure is unstable and easy to collapse, and the compact integrity is poor. If the binder content is low, the bonding effect amongst the coke particles is not enough, the compressive stress is difficult to maintain, and the strengthening effect is not enough, which will cause the $PD_{5t}/PD_{0.5t}$ to be relatively large.

In Comparative Example 10, the mass fraction of the binder is more than 10%, and the binder has more carbon residue, which reduces the performance of the graphite material.

In Comparative Example 11, the volatiles content of the green coke is less than 8%, and the structural integrity of the green compact is poorly maintained. If the volatiles content of the green coke particles is relatively low, the bonding effect of the graphite in the high-temperature graphitization stage is weak, and the strengthening effect is relatively low, then $PD_{5t}/PD_{0.5t}$ is large.

Figure 1:
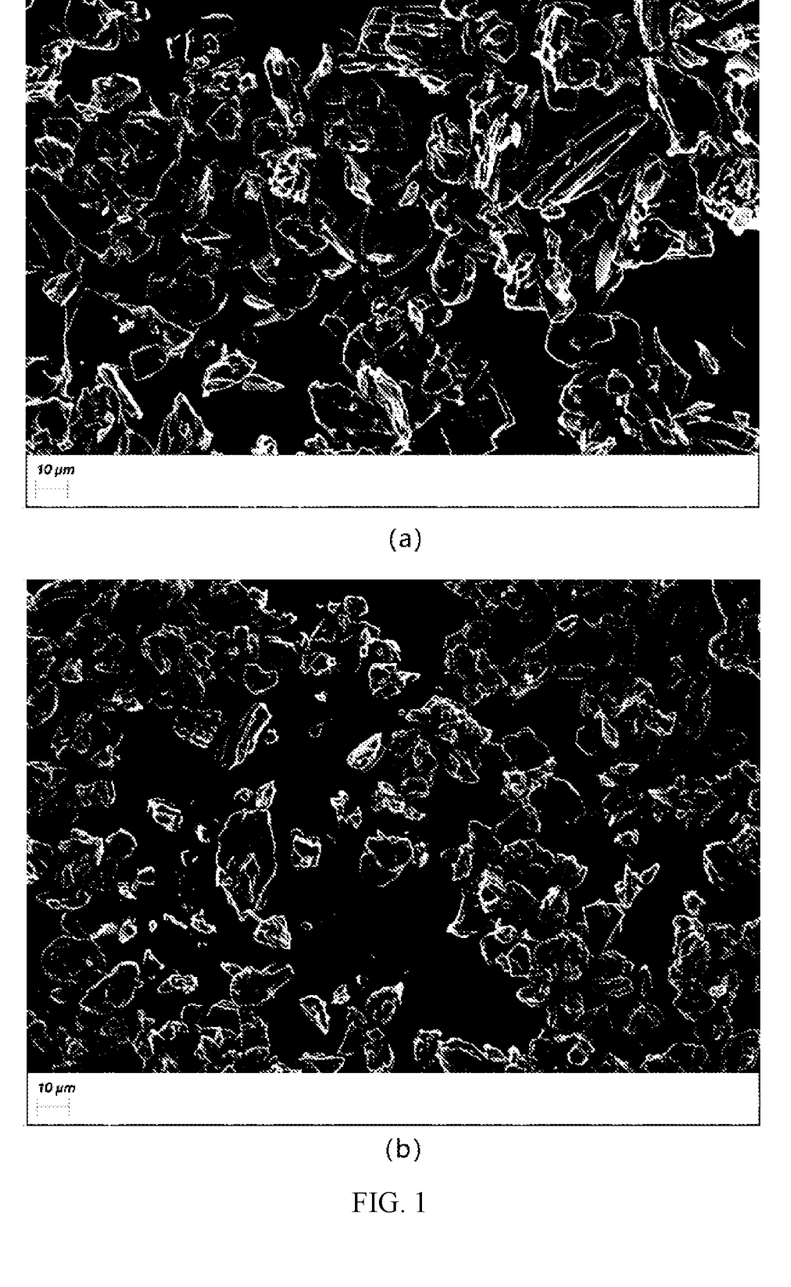

(a) and (b) of FIG. 1 are scanning electron microscope photographs of artificial graphites in an example of the present application and a comparative example, respectively. As shown in FIG. 1(a), for the sample of the example of the present disclosure, since the raw material particles have a good bonding effect during the graphitization process, the particle size is relatively large, the particles are irregular in geometry, and the surface defects are low. As shown in FIG. 1(b), for the sample of the comparative example, due to the poor bonding effect of the raw material particles during the graphitization process, the particle size is relatively small and the particle shape is irregular.

The above experimental phenomena and the rules summarized according to the experimental phenomena are all discovered for the first time in the present application, and cannot be expected by those skilled in the art before the present application. The technical effects achieved by the artificial graphites prepared in Examples 1 to 7 are all discovered for the first time in the present application, and cannot be expected by those skilled in the art before the present application.

The invention claimed is:

1. An artificial graphite, satisfying: $PD_{5t}/PD_{0.5t} \leq 1.35$, and $PD_{0.5t} \geq 1.4$ g/cm$^3$, wherein $PD_{5t}/PD_{0.5t}$ characterizes a sensitivity of the artificial graphite to pressure changes, $PD_{5t}$ is a compacted density of the artificial graphite measured under a pressure of 5 ton, and $PD_{0.5t}$ is a compacted density of the artificial graphite measured under a pressure of 0.5 ton; a median particle size Dv50 of the artificial graphite satisfies: Dv50≥10 μm; a specific surface area SSA of the artificial graphite satisfies: SSA≤1.5 g/m$^2$; and a tap density of the artificial graphite is 0.9 g/cm$^3$ or more.

2. The artificial graphite according to claim 1, wherein the artificial graphite satisfies: $1.23 \leq PD_{5t}/PD_{0.5t} \leq 1.3$.

3. The artificial graphite according to claim 1, wherein the artificial graphite satisfies: $PD_{5t} \geq 1.8$ g/cm$^3$.

4. The artificial graphite according to claim 1, wherein a degree of graphitization of the artificial graphite is 90% or more.

5. The artificial graphite according to claim 1, wherein a gram capacity of the artificial graphite is 340 mAh/g or more.

6. A secondary battery comprising an artificial graphite that satisfies: $PD_{5t}/PD_{0.5t} \leq 1.35$, and $PD_{0.5t} \geq 1.4$ g/cm$^3$, wherein $PD_{5t}/PD_{0.5t}$ characterizes a sensitivity of the artificial graphite to pressure changes, $PD_{5t}$ is a compacted density of the artificial graphite measured under a pressure of 5 ton, and $PD_{0.5t}$ is a compacted density of the artificial graphite measured under a pressure of 0.5 ton; a median particle size Dv50 of the artificial graphite satisfies: Dv50≥10 μm; a specific surface area SSA of the artificial graphite satisfies: SSA≤1.5 g/m$^2$; and a tap density of the artificial graphite is 0.9 g/cm$^3$ or more.

7. A method for preparing an artificial graphite, comprising:
preparing green coke particles, calcined coke particles, a binder, and a solvent into a mixture;
forming the mixture to obtain an intermediate;
removing at least part of the solvent from the intermediate to obtain a green compact;
graphitizing the green compact to obtain a graphite compact; and
making the graphite compact into a powder to obtain the artificial graphite;
wherein the artificial graphite satisfies: $PD_{5t}/PD_{0.5t} \leq 1.35$, and $PD_{0.5t} \geq 1.4$ g/cm$^3$, wherein $PD_{5t}/PD_{0.5t}$ characterizes a sensitivity of the artificial graphite to pressure changes, $PD_{5t}$ is a compacted density of the artificial graphite measured under a pressure of 5 ton, and $PD_{0.5t}$ is a compacted density of the artificial graphite measured under a pressure of 0.5 ton; a median particle size Dv50 of the artificial graphite satisfies: Dv50≥10 μm; a specific surface area SSA of the artificial graphite satisfies: SSA≤1.5 g/m$^2$; and a tap density of the artificial graphite is 0.9 g/cm$^3$ or more.

8. The method according to claim 7, wherein a content of the green coke particles is 35 wt % or more of a total mass of the green coke particles, the calcined coke particles, and the binder.

9. The method according to claim 7, wherein a content of the binder is 2 wt % or more of a total mass of the green coke particles, the calcined coke particles, and the binder.

10. The method according to claim 7, wherein a volatile content of the green coke particles is ≥6 wt %.

11. The method according to claim 7, wherein an apparent density of the green compact is 1.3 g/cm$^3$ or more.

12. The method according to claim 7, wherein a packing density of the green compact is 0.85 g/cm$^3$ or less.

13. The method according to claim 7, wherein the green compact has one or more features of following:
a dimension of the green compact in at least one direction is ≥1 cm;
dimensions of the green compact in at least two directions perpendicular to each other are both ≥1 cm;
dimensions of the green compact in three directions perpendicular to each other are all ≥1 cm; and
a shape of the green compact is selected from one or more of a columnar shape, a spherical shape, an ellipsoidal shape, and a bulky shape.

14. The method according to claim 7, wherein one or more of following features are satisfied:
a median particle size Dv50 of the green coke particles is less than a median particle size Dv50 of the calcined coke particles;
the median particle size Dv50 of the green coke particles is 15 μm or less; and
the median particle size Dv50 of the calcined coke particles is 20 μm or less.

15. The method according to claim 7, wherein the binder is evaporable or decomposable at 1000° C. or more.

16. The method according to claim 7, wherein the binder is a polymeric binder.

* * * * *